United States Patent
Hayashi et al.

[11] Patent Number: 6,096,285
[45] Date of Patent: Aug. 1, 2000

[54] INDIUM TIN OXIDE FINE POWDER AND METHOD FOR PREPARING THE SAME

[75] Inventors: Takao Hayashi; Kouichi Kawaratani, both of Yamaguchi; Hiroyuki Shimamura, Tokyo, all of Japan

[73] Assignee: Mitsui Mining and Smelting Co., Ltd., Tokyo, Japan

[21] Appl. No.: 09/178,612

[22] Filed: Oct. 26, 1998

[30] Foreign Application Priority Data

Dec. 2, 1997 [JP] Japan .................................. 9-345745

[51] Int. Cl.[7] .................................................. C01G 17/02
[52] U.S. Cl. .......................... 423/618; 423/92; 423/115; 423/593; 423/624
[58] Field of Search .................... 423/618, 624, 423/92, 115, 593

[56] References Cited

U.S. PATENT DOCUMENTS

| | | | |
|---|---|---|---|
| 4,594,182 | 6/1986 | Hashimoto et al. | 252/518 |
| 4,962,071 | 10/1990 | Bayard | 501/134 |
| 4,969,956 | 11/1990 | Kreider et al. | 136/201 |
| 5,071,800 | 12/1991 | Iwamoto et al. | 501/126 |
| 5,401,701 | 3/1995 | Ogawa et al. | 501/134 |
| 5,417,816 | 5/1995 | Nakashima et al. | 204/96 |
| 5,480,532 | 1/1996 | Schlott et al. | 204/298.13 |
| 5,580,496 | 12/1996 | Yukinobu et al. | 252/518 |
| 5,654,096 | 8/1997 | Yamada et al. | 428/373 |
| 5,772,924 | 6/1998 | Hayashi et al. | 252/520.1 |
| 5,853,887 | 12/1998 | Yoshimoto et al. | 428/404 |
| 5,866,493 | 2/1999 | Lee et al. | 501/134 |

FOREIGN PATENT DOCUMENTS 1-290527  11/1989  Japan .
2-006332   1/1990  Japan .
6-227815   8/1994  Japan .

OTHER PUBLICATIONS

A.N. Christensen et al., Hydrothermal Investigation of the System $In_2O_3$—$H_2O$—$Na_2O$ and $In_2O_3$—$D_2O$—$Na_2O$. The Crystal Structure of Rhombohedral $In_2O_3$ and of $IN(OH)_3$, pp. 1047–1056, ACTA Chemica Scandinavica, vol. 21, No. 4, 1967.

*Primary Examiner*—Steven P. Griffin
*Assistant Examiner*—Cam N. Nguyen
*Attorney, Agent, or Firm*—Young & Thompson

[57] ABSTRACT

Herein disclosed is 6 indium tin oxide (ITO) fine powder whose crystal form is a corundum type one and which has a true specific gravity of not less than 6.5 g/cc, a green density of not less than 3.0 g/cc, and a Seebeck coefficient of less than 30 $\mu$V/cc at ordinary temperature and less than 80 $\mu$V/cc after heating at 200° C. The ITO fine powder can be prepared by a method which comprises the steps of neutralizing an aqueous solution containing an indium salt and a tin salt with ammonia to thus control the pH of the reaction solution to the range of from 6.8 to 7.5; separating the resulting neutralized precipitates through filtration; drying and washing the precipitates; calcining the precipitates in the air at a temperature ranging from 550 to 700° C.; and then reducing-burning at a temperature ranging from 350 to 450° C. in a reducing atmosphere.

4 Claims, 2 Drawing Sheets

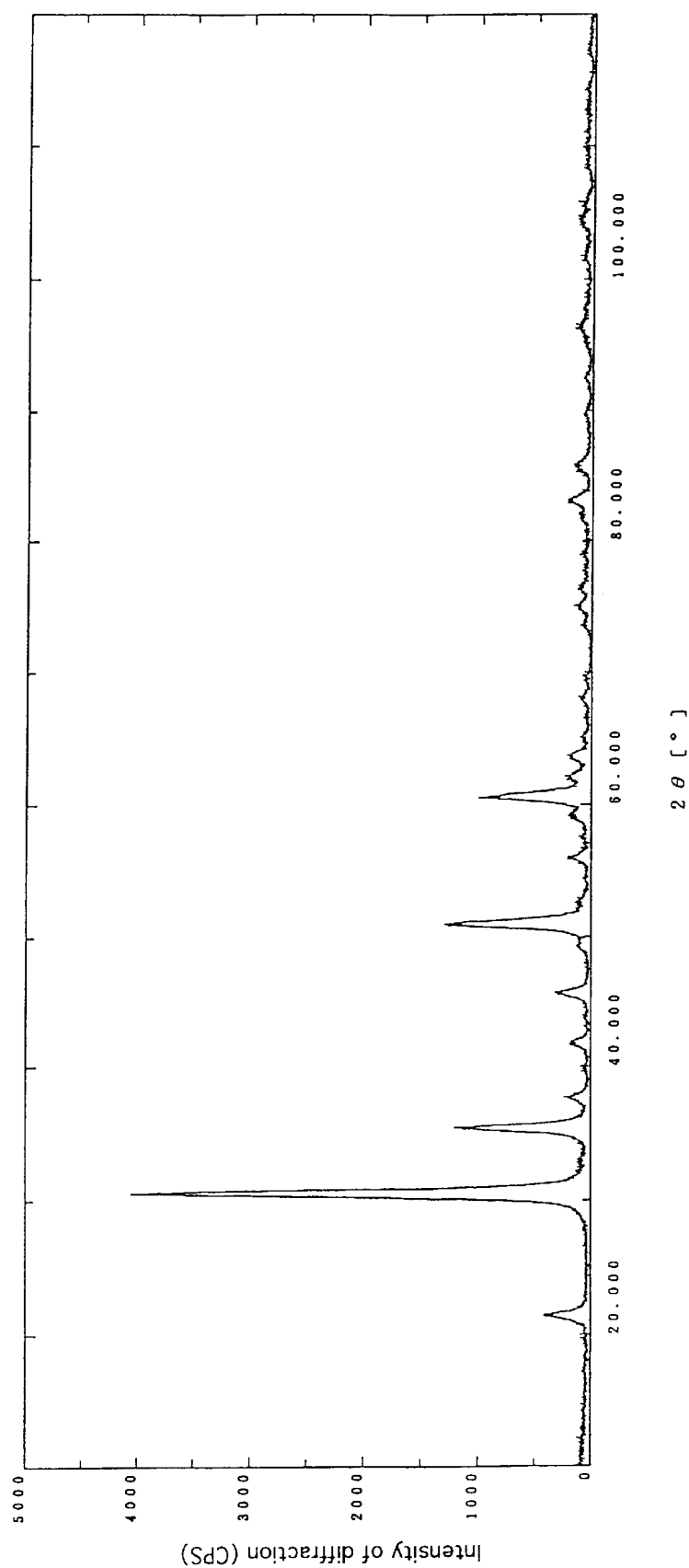

6,096,285

INDIUM TIN OXIDE FINE POWDER AND METHOD FOR PREPARING THE SAME

BACKGROUND OF THE INVENTION (a) Field of the Invention

The present invention relates to Indium Tin Oxide (ITO) fine powder for forming a transparent, conductive, thin film mainly used for, for instance, liquid crystal display and electromagnetic wave-shielding and a method for preparing the ITO fine powder.

(b) Description of the Prior Art

A transparent, conductive, thin film has been a necessary and indispensable structural element in display elements such as LCD (liquid crystal display) elements, irrespective of active matrix type or simple matrix type, with the wide spread of electronic equipment. There has widely been used an ITO material as a principal material for forming such a thin film and accordingly, it is a matter of course that there has been desired for the development or improvement of ITO powdery materials as well as various thin film-forming techniques.

As techniques for forming transparent, conductive, thin films, there have been known, for instance, vacuum evaporation, sputtering, CVD and spray methods, but these techniques suffer from various problems in that they are insufficient in productivity, that they require the use of expensive devices, that they cost too much for forming thick films and that if the resulting films are thin, then the thin films are insufficient in durability. For this reason, there have recently been investigated methods comprising coating a paint and varnish in which ITO fine powder is dispersed, in place of these techniques and ITO fine powder suitably used for these coating methods has likewise been variously investigated.

Regarding the crystal structure, ITO has been known to have a bixbyite type or corundum type crystal structure, but those industrially put into practical use are overwhelmingly bixbyite type ones. This is because, the typical method for producing the ITO fine powder which has been practically used and permits the mass-production thereof is a wet method comprising the steps of reacting an aqueous solution containing an indium salt and a tin salt with an alkali to thus co-precipitate hydroxides of indium and tin and then decomposing the hydroxides with heating and accordingly, most of the ITO fine powder products prepared by this method are bixbyite type ones.

This bixbyite type ITO satisfies some requirements for ITO fine powder suitable for forming a transparent, conductive, thin film, such as low powder flow resistance and high dispersibility, but it has a low true specific gravity and a low green density and, what is more, the Seebeck coefficient (proportional to the reciprocal number of carrier electron density) of the ITO powder as an indication of the conductivity thereof is not always stable at ordinary temperature and even during heating. The true specific gravity and green density of the ITO fine powder serve as an indication relating to the packing characteristics of the powder in a film when the ITO fine powder is incorporated into paints and varnishes and the resulting paints and varnishes are formed into transparent, conductive, thin films. In this connection, the higher the true specific gravity and green density of the ITO fine powder, the lower the electric resistance of the resulting transparent, conductive, thin film. In addition, the temperature-stability (or independency) of the Seebeck coefficient of the powder is very important to ensure the thermal resistance thereof which is required when heating the paint and varnish at around 200° C. in the process for forming a transparent, conductive, thin film.

SUMMARY OF THE INVENTION

Accordingly, an object of the present invention is to provide ITO fine powder which has sufficiently high true specific gravity and green density and which is excellent in thermal stability when it is heated to a high temperature in the process for forming a transparent, conductive, thin film.

The inventors of this invention have conducted various studies to solve the foregoing problems associated with the conventional ITO fine powder, as a result, have found that an intended ITO fine powder can be produced by the use of a specific neutralizing agent and by establishing specific conditions for the reaction, calcination and burning treatments, and thus have completed the present invention.

According to a first aspect of the present invention, there is thus provided ITO fine powder whose crystal form is a corundum type one and which has a true specific gravity of not less than 6.5 g/cc, a green density of not less than 3.0 g/cc, and a Seebeck coefficient of less than 30 $\mu$V/cc at ordinary temperature and less than 80 $\mu$V/cc after heating at 200° C.

According to a second aspect of the present invention, there is provided a method for preparing the foregoing ITO fine powder which comprises the steps of neutralizing an aqueous solution containing an indium salt and a tin salt with ammonia to thus control the pH of the reaction solution to the range of from 6.8 to 7.5; separating the resulting neutralized precipitates through filtration; drying and washing the precipitates; calcining the precipitates in the air at a temperature ranging from 550 to 700° C., preferably from 600 to 700° C.; and then reducing-burning at a temperature ranging from 350 to 450° C. in a reducing atmosphere.

BRIEF DESCRIPTION OF THE DRAWINGS

FIG. 2 is an X-ray diffraction pattern of the ITO fine powder prepared in Comparative Example 1.

DESCRIPTION OF THE PREFERRED EMBODIMENTS

Figure 1:
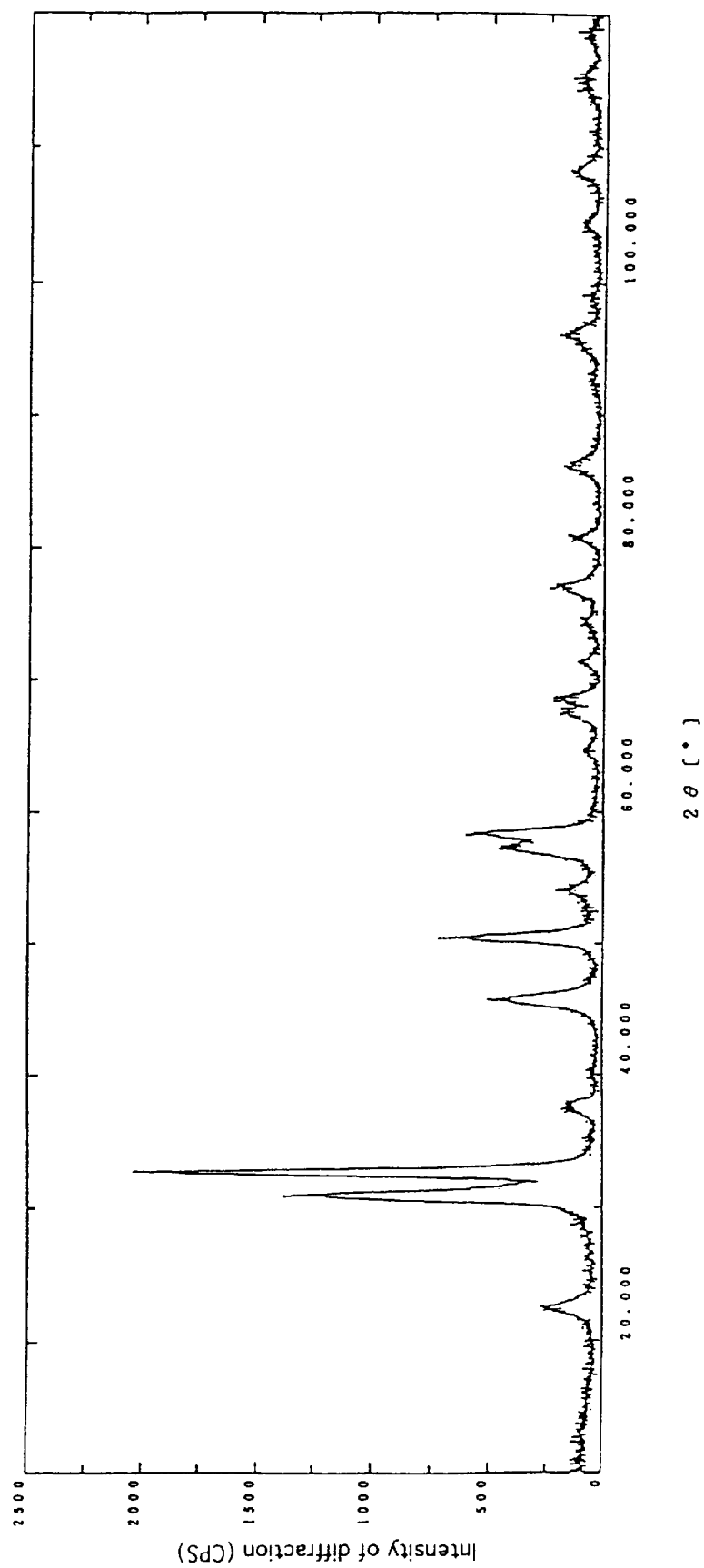
FIG. 1 is an X-ray diffraction pattern of the ITO fine powder prepared in Example 1.

The presence of the corundum type ITO fine powder is disclosed in an article of Christensen et al. (Acta Chem. Scand., 1967, 21, No. 4), but this article does not disclose the characteristic properties, industrial applications and any simple methods for preparing the same very much.

More specifically, if controlling the pH value during the reaction in the wet neutralization method, indium hydroxide is preferentially separated from the reaction system in the alkaline pH region, while tin hydroxide is preferentially separated therefrom in the acidic pH region. Therefore, it would be considered that both of them are relatively uniformly formed and separated in the neutral pH region. However, the mechanism of the formation of the corundum type ITO fine powder has not yet been clearly elucidated. It would be assumed that ammonia may have any effect on the reaction system. In fact, even if hydroxides are co-precipitated using neutralizing agents other than ammonia, it is difficult to obtain any ITO fine powder having such a desired crystal structure. For this reason, the use of ammonia as a neutralizing agent is indispensable in order to steadily and stably prepare corundum type ITO fine powder. Moreover, even if ammonia is used as a neutralizing agent, only bixbyite type ITO fine powder is produced when the pH of the reaction system is beyond the predetermined range, i.e., 6.8 to 7.5.

In the present invention, preferably used sources of indium and tin components are, for instance, water-soluble salts thereof such as indium (III) nitrate, indium (III) chloride, indium (III) bromide, indium (III) sulfate, tin (II) chloride, tin (II) fluoride, tin (II) bromide, tin (II) iodide and tin (II) sulfate.

In the present invention, the resulting neutral hydroxide is filtered off, dried, washed and then calcined in the air. The calcination temperature likewise serves as an important factor and suitably ranges from 550 to 700° C., preferably from 600 to 700° C. If the temperature is less than 550° C., the resulting fine powder easily undergoes agglomeration and is thus insufficient in dispersibility, while if it exceeds 700° C., the resulting fine powder may partially undergo sintering-like phenomenon. In addition, the temperature at which the precipitated oxide is reducing-burned in a reducing atmosphere after the calcination is also an important factor and suitably ranges from 350 to 450° C. If the temperature is less than 350° C., oxygen vacancy is insufficiently formed within the resulting fine grains and thus the latter is inferior in the conductivity, while if it is more than 450° C., the resulting fine powder may partially undergo sintering-like phenomenon.

The method according to the present invention permits the production of ITO fine powder whose crystal form is a corundum type one, which has a true specific gravity of not less than 6.5 g/cc, a green density of not less than 3.0 g/cc, a Seebeck coefficient of less than 30 $\mu$V/cc at ordinary temperature and less than 80 $\mu$V/cc after heating at 200° C. and a TG (change in weight) value of the neutralized and dried precipitate prior to the calcination as determined by the differential thermal analysis of less than 10%. The ITO fine powder is considerably suitable for a material for forming a transparent, conductive, thin film mainly used for, for instance, liquid crystal display devices and electromagnetic wave-shielding, because of its excellent characteristic properties.

The present invention will hereinafter be described in more detail with reference to the following working Examples, but the present invention is not restricted to these specific Examples at all.

EXAMPLE 1

To pure water, there were dissolved 138.82 g of indium nitrate and 15.42 g of tin chloride to give one liter of an aqueous solution. The aqueous solution was added to a container in parallel with the addition of aqueous ammonia (concentration: 5% by weight), while maintaining the pH value of the reaction solution to 7.2 to thus give co-precipitated hydroxides of indium and tin. The resulting co-precipitated hydroxides were treated by the usual filtration and drying methods to give powder, followed by calcination thereof at 600° C. for 60 minutes in the air. The resulting calcined powder was burned at 400° C. for 90 minutes in an atmosphere which comprised 2.8% by volume hydrogen and the balance of nitrogen gas to give ITO fine powder. The resulting ITO fine powder was subjected to a morphological analysis using an X-ray diffractometer. The results obtained are shown in FIG. 1. The morphological analysis data clearly showed peaks peculiar to the corundum type crystal structure. In addition, other characteristic properties, i.e., the true specific gravity, the green density and the TG (change in weight) value of the dried product were determined using Multivolume available from Shimadzu Corporation, Loresta AP (pressure load: 2 Kg/cm$^2$) available from Mitsubishi Chemical Co., Ltd. and TG-DTA available from Rigakudenki Co., Ltd., respectively. The results thus obtained are summarized in the following Table 1. Moreover, the Seebeck coefficient was determined by the following method. First a sample was subjected to a hot press treatment at a temperature ranging from 480 to 510° C. and a pressure of 2.94 GPa for one hour in an argon gas atmosphere to form a pellet having a diameter of 144 mm and a thickness of 35 mm. Then a thermocouple of Cu-constantan was attached to this pellet using pressure in a parallel relation, followed by controlling the temperature of the top face of the sample to 25° C. and that of the back face thereof to 15° C. using a Peltier element and determination of the thermoelectromotive force to thus calculate the Seebeck coefficient. The results thus obtained are also listed in Table 1.

COMPARATIVE EXAMPLE 1

The same procedures used in Example 1 were repeated except that the pH value of the reaction solution was set at 10.0 to give ITO fine powder. The resulting ITO fine powder was subjected to a morphological analysis using an X-ray diffractometer. The results obtained are shown in FIG. 2. The morphological analysis data clearly showed peaks peculiar to the bixbyite type crystal structure. In addition, other characteristic properties, i.e., the true specific gravity, the green density and the TG (change in weight) value of the dried product were determined and the Seebeck coefficient was also calculated by the methods used in Example 1. The results obtained are also summarized in Table 1.

COMPARATIVE EXAMPLE 2

The same procedures used in Example 1 were repeated except that the pH value of the reaction solution was set at 3.5 to give ITO fine powder. As to the resulting ITO fine powder, the true specific gravity, the green density and the TG (change in weight) value of the dried product were determined and the Seebeck coefficient was also calculated by the methods used in Example 1. The results obtained are also summarized in Table 1

TABLE 1

| Ex. No. | True Spec. Gravity (g/cc) | Green Density (g/cc) | Seebeck Coefficient ($\mu$V/° C.) | | TG Value of Dried Product (%) |
|---|---|---|---|---|---|
| | | | Ordinary Temp. (20° C.) | After Heating to 200° C. | |
| 1 | 6.73 | 3.42 | 26 | 52 | 7.9 |
| 1* | 6.17 | 2.70 | 55 | 100 | 15.8 |
| 2* | 6.05 | 2.65 | 35 | 95 | 15.2 |

*: Comparative Example

The foregoing results clearly indicate that the ITO fine powder of the present invention has a true specific gravity of not less than 6.5 g/cc and a green density of not less than 3.0 g/cc and therefore, it is excellent in properties as an additive for forming a transparent, conductive, thin film. In addition the ITO fine powder also has a sufficiently low Seebeck coefficient which serves as an indication of the conductivity and also shows only small changes in numerical values after heating it to 200° C. Furthermore, it has a low TG (change in weight) value of the neutralized and dried precipitates prior to the calcination as determined by the differential thermal analysis, on the order of less than 10% and this clearly indicates that the ITO fine powder has characteristic properties pecurior to the corundum type crystal structure having a low content of residual hydroxide groups.

As has been discussed above in detail, the method of the present invention permits the production of novel ITO fine powder having sufficiently high true specific gravity and green density and excellent in stability against temperature during heating at a high temperature in the process for forming a transparent, conductive, thin film. More specifically, the method permits the production of ITO fine powder whose crystal form is a corundum type one, which has a true specific gravity of not less than 6.5 g/cc, a green density of not less than 3.0 g/cc, a Seebeck coefficient of less than 30 $\mu$V/cc at ordinary temperature and less than 80 $\mu$V/cc after heating at 200° C. and a TG (change in weight) value of the neutralized and dried precipitate prior to the calcination as determined by the differential thermal analysis of less than 10%. Therefore, the ITO fine powder is considerably suitable for a material for forming a transparent, conductive, thin film mainly used for, for instance, liquid crystal displays and electromagnetic wave-shielding.

What is claimed is:

1. Indium tin oxide fine powder which has a corundum crystal structure and which has a true specific gravity of not less than 6.5 g/cc, a green density of not less than 3.0 g/cc, and a Seebeck coefficient of less than 30 $\mu$V/cc at ordinary temperature and less than 80 $\mu$V/cc after heating at 200° C.

2. The indium tin oxide fine powder of claim 1 wherein it has a TG of the neutralized and dried precipitate prior to the calcination as determined by the differential thermal analysis of less than 10%.

3. A method for preparing indium tin oxide fine powder which has a corundum crystal structure and which has a true specific gravity of not less than 6.5 g/cc, a green density of not less than 3.0 g/cc, and a Seebeck coefficient of less than 30 $\mu$V/cc at ordinary temperature and less than 80 $\mu$V/cc after heating at 200° C., the method comprising the steps of neutralizing an aqueous solution containing an indium salt and a tin salt with ammonia to thus control the pH of the reaction solution to the range of from 6.8 to 7.5; separating the resulting neutralized precipitates through filtration; drying and washing the precipitates; calcining the precipitates in the air at a temperature ranging from 550 to 700° C.; and then reducing-burning at a temperature ranging from 350 to 450° C. in a reducing atmosphere.

4. The method for preparing indium tin oxide fine powder according to claim 3 wherein the precipitates are calcined in the air at a temperature ranging from 600 to 700° C.

* * * * *